July 5, 1966  E. A. LENKER  3,259,122
PAVING DEVICE
Filed July 5, 1963  3 Sheets-Sheet 1
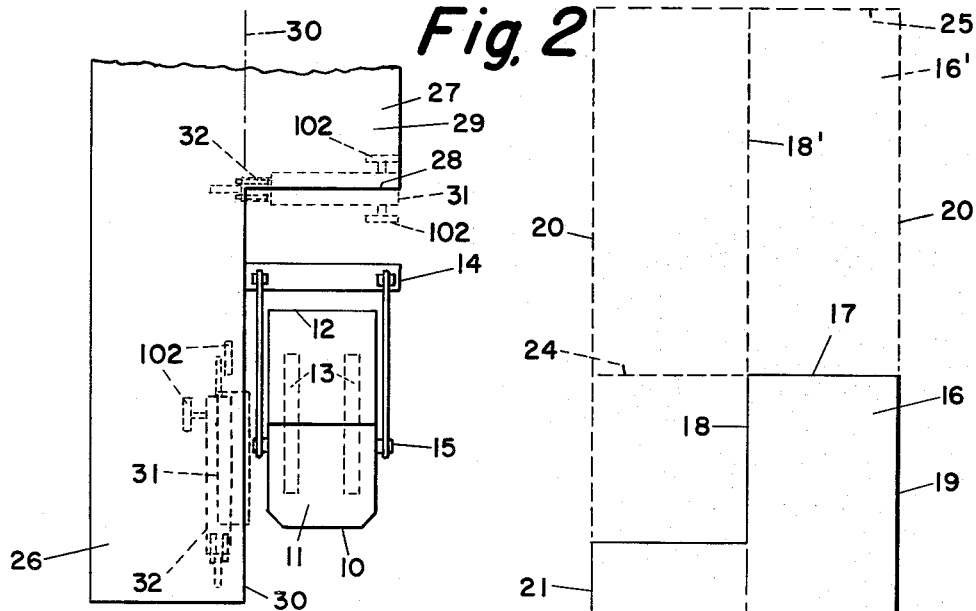
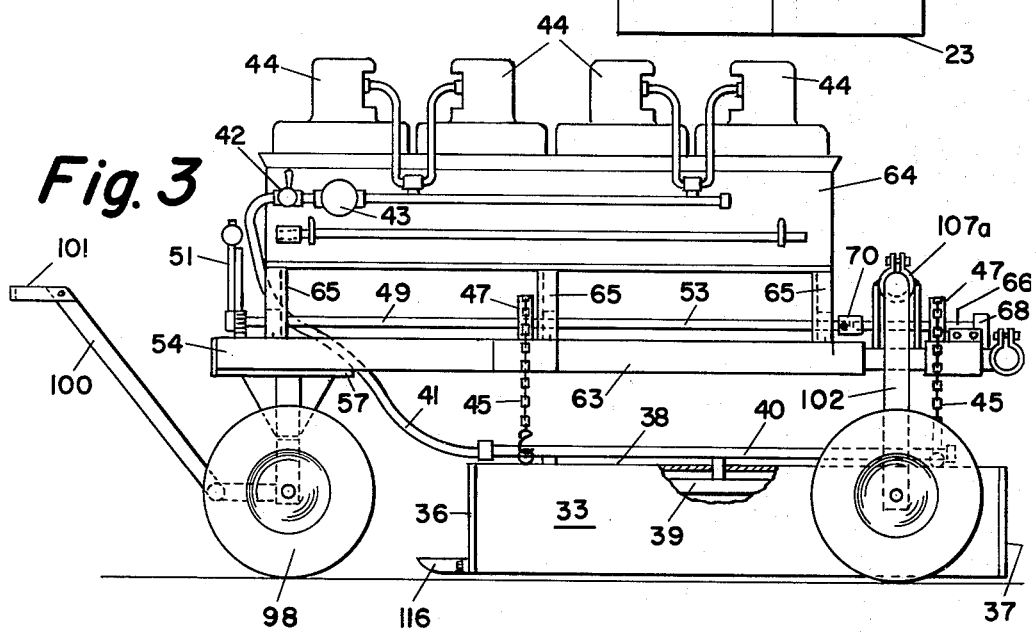
INVENTOR.
EARL A. LENKER
BY Morris Michael Marks
ATTORNEY July 5, 1966  E. A. LENKER  3,259,122
PAVING DEVICE Filed July 5, 1963  3 Sheets-Sheet 2

INVENTOR.
EARL A. LENKER
BY
Morris Michael Marks
ATTORNEY

July 5, 1966  E. A. LENKER  3,259,122
PAVING DEVICE
Filed July 5, 1963  3 Sheets-Sheet 3
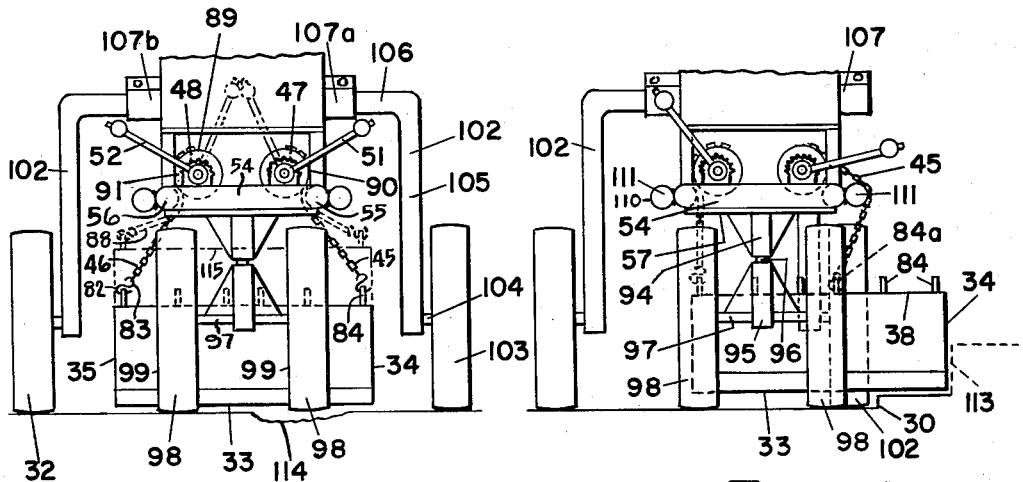
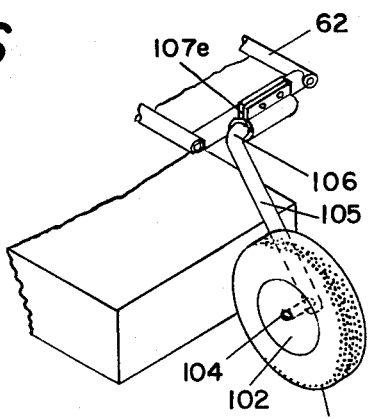
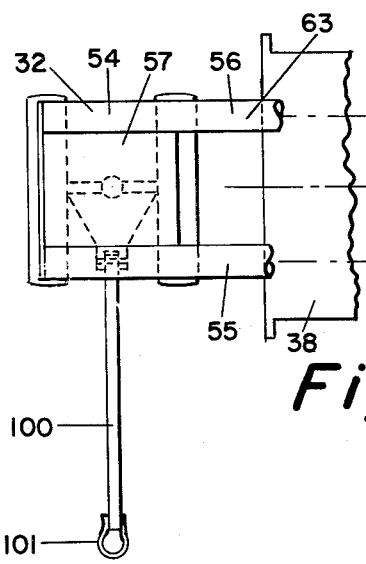
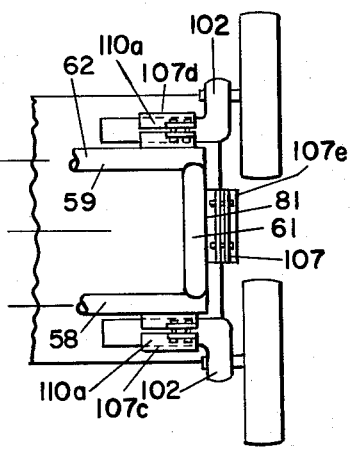
INVENTOR.
EARL A. LENKER
BY
Morris Michael Marks
ATTORNEY

United States Patent Office

3,259,122
Patented July 5, 1966

3,259,122
PAVING DEVICE
Earl A. Lenker, 2916 Michele Drive, Norristown, Pa.
Filed July 5, 1963, Ser. No. 293,003
18 Claims. (Cl. 126—271.2)

My invention relates to chassis, and it relates more particularly to a chassis for conveying a utilitarian device, and for disposing said device in proper position for performing its utilitarian function.

One object of my invention is to provide a chassis for a utilitarian device, which is so constructed as to enable said device to perform its function with respect to an object not carried by said chassis, and without interference from the chassis itself.

Another object of my invention is to provide a chassis adapted to suspend a utilitarian device and to convey it to a desired location, with a minimum of sway.

A further object of my invention is to provide a chassis for a utilitarian device, which is so constructed as to enable it to convey it to a desired location, with a minimum of sway.

A further object of my invention is to provide a chassis for a utilitarian device, which is so constructed as to enable it to convey said utilitarian device in a plurality of directions for performing the work function of said device.

Another object of my invention is to provide a paving device for heating selected portions of a paving area, and which is so constructed as to enable the heater to be conveyed to said area with a minimum of sway, and to be projected over the area in optimum heating position regardless of the angle of location of the area with respect to the axis of the chassis.

A further object of my invention is to provide a chassis for a utilitarian device, which is adapted to be adjusted for conveying said device either longitudinally or transversely, and which shall be efficient and dependable in operation, sturdy, and readily and inexpensively made.

For the purpose of illustrating my invention, I have shown in the accompanying drawings one form thereof which is at present preferred by me, since the same has been found to give satisfactory and reliable results, although it is to be understood that the various instrumentalities of which my invention consists can be variously arranged and organized, and that my invention is not limited to the precise arrangements and organizations of the instrumentalities as herein shown and described.

Referring now to the drawings in which like reference characters indicate like parts:

FIGURE 1 represents a plan view of a paving machine and a road being constructed by said paving machine, and illustrating the same in conjunction with a chassis of my invention, as said chassis may be used in two of the functions for which it is adapted.

FIGURE 2 represents a plan view of a portion of a road being constructed by the paving machine illustrated in FIGURE 1.

FIGURE 3 represents a vertical elevational view of a paving device comprising a chassis embodying my invention.

FIGURE 6 represents a fragmentary front elevational view of a paving device comprising a chassis, and embodying my invention.

FIGURE 7 represents a front elevational view of a paving device comprising a chassis, and illustrating the heater projected transversely in a manner to enable it to heat an asphalt joint in optimum relation to the joint, and without interference from the wheels, in accordance with my invention.

FIGURE 8 represents a fragmentary perspective view of the rear portion of the paving device comprising a chassis illustrated in FIGURE 7, and illustrating the disposition of the rear wheel with respect to the heater and the frame, and embodying my invention.

FIGURE 9 represents a fragmentary plan view of a paving machine comprising a chassis, illustrating the same in condition for lateral movement of the frame and heater, and embodying my invention.

Figure 4:
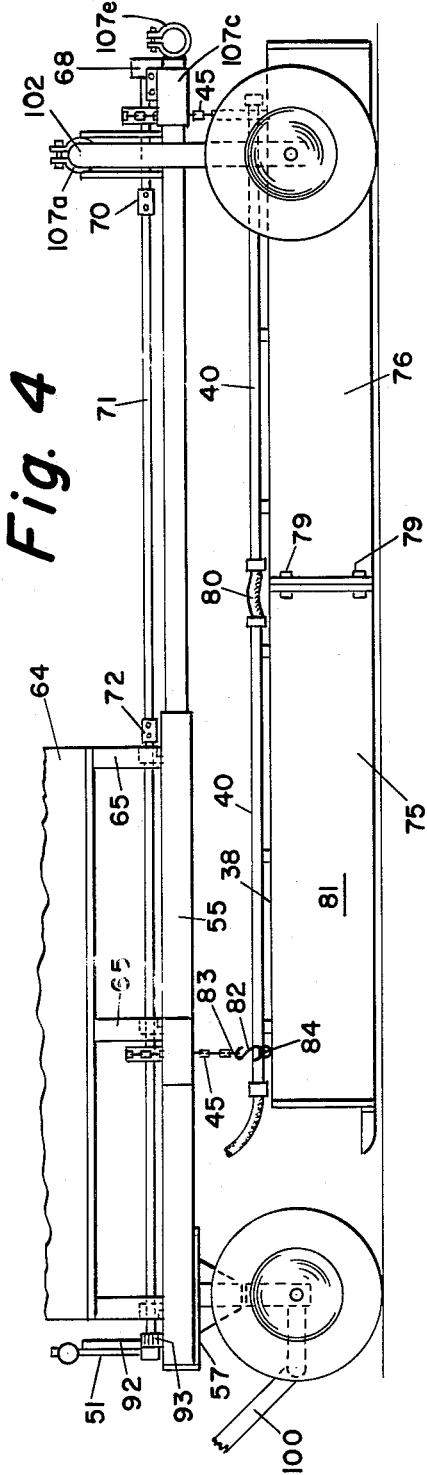
FIGURE 4 represents a fragmentary elevational view of the paving device comprising a chassis, illustrated in FIGURE 3, showing the same in extended form and carrying an auxiliary heater, and embodying my invention.

My invention is adapted for use with utilitarian devices of various kinds; and for purposes of illustration, the invention will be described in conjunction with an infrared heating unit for use in asphalt-type paving construction and maintenance, and particularly such construction and maintenance as applied to roads or streets, or other paved areas such as airports and parking areas.

In the paving of a road or street by means of asphalt, a paving machine such as the machine 10, is generally used. This machine comprises a bed portion 11 for containing heated asphalt-type paving material, vented across the rear 12 to allow the release of said paving material as the machine 10 advances forwardly on its tractor-type treads 13. A screed 14 pivoted to the sides of the machine 10 as at 15 scrapes the top of the paving material after it leaves the vented rear 12 and guides its flow from the machine in a manner to spread the paving material evenly and at a desired level, as the machine 10 advances.

In so doing, a strip of pavement 16 is laid. The strip of paving 16 comprises a forward or transverse joint 17, a side or longitudinal joint 18 and an outer edge 19. The longitudinal joint 18 is generally intermediate the sides 20 of the road 21 being laid. Thus as illustrated in FIGURE 2, the outer edge 19 may be identical with a side 20 of the road 21, and the longitudinal joint 18 may be substantially along the center of said road 21. As the strip 16 is laid, the longitudinal joint 18 begins to cool, and it is of importance that it be not permitted to cool to such an extent that it will not fuse with the next strip of pavement 22 which is longitudinally laid alongside it. For this reason, it has been one practice to lay a short run of strip 16 and then move the paving machine 10 back to a position alongside the beginning line 23 of the strip 16, and lay the adjacent strip 22 along the joint 18 of the strip 16 until the strip 22 has been paved to a line 24 in registry with the transverse joint 17 of the strip 16. If the run is short enough, the strip 22 will have been laid before the joint 18 has cooled below the fusing point, and proper fusing will take place at the joint 18.

The paving machine may then return to the original strip 16 if the transverse joint 17 has not yet cooled below the fusing point, and resume laying the strip 16 for another short run 16' to a transverse joint along the line 25, whereupon it returns to the strip 22 and commences the next run along that strip, fusing with the transverse joint along the line 24, and the longitudinal joint 18' formed along the run 16'. This process may continue for the length of the road, with the paving machine 10 shuttling back and forth from the transverse joint ending a short run of one strip, to the transverse joint ending a previously made short run of the adjacent strip, the paving material of each short run fusing with the not-yet-cooled transverse longitudinal joints of the adjacent previously laid short runs. Much time, labor and fuel is expended in this shuttling action.

On the other hand, if the transverse joint 17 has cooled below the fusing point when the initial run of the strip 22 has been laid, the paving machine 10 may continue from the line 24 for another short run, terminating at a transverse joint along the line 25, whereupon the machine returns to the original strip 16. Before resuming paving the original strip 16 however, it is necessary to reheat the transverse joint 17 until it has attained a temperature which will enable it to fuse with the paving material being laid in the next run of the strip 16. While this procedure makes it possible to reduce the shuttling of the paving machine 10 by approximately one-half, the length of each run is nevertheless limited by the time it takes to cool each longitudinal joint 18. Thus valuable time, labor and fuel is still consumed in the process.

According to my invention, means and method are provided which will eliminate the need for shuttling the paving machine 10 back and forth between adjacent strips. Instead, by means of my invention one continuous strip 26 may be laid of any desired distance, and may even represent one day's continuous operation without pause except perhaps for reloading the machine with paving material. The next adjacent strip 27 can then also be laid in one continuous operation, fusing with the transverse joint 28 of the previously laid run 29 of said strip and the longitudinal joint 30 of the strip 26. This is achieved by means of a heater 31 carried on a unique chassis 32 which is adapted readily to be positioned in operative conjunction with the transverse joint in any of the various conditions in which said joint may be found, and also to be drawn along side the paving machine 10 in a manner to be positioned over the longitudinal joint 30 of the previously laid strip, in advance of the screed 14 while the paving machine 10 lays the next adjacent strip 27, said chassis being adapted to be disposed on either side of the paving machine 10 so as to enable the machine 10 to be used in this manner regardless of whether the strip 26 or the strip 27 is being laid.

While any of various heaters may be used, I have found that the infra-red type of heater is admirably suited for the purpose of my invention. Thus the heater may comprise a heat reflecting unit 33 having side walls 34 and 35, front wall 36, rear wall 37 and a top 38. Suitable infra-red heating units 39 are mounted in the reflecting unit 33 and may be connected to a manifold 40 mounted on the top 38. The manifold 40 may be connected by any suitable means such as the flexible hose 41, valve 42 and pressure regulator 43, to a suitable container or containers 44 of propane or other desired fuel.

The heat reflecting unit 33 is preferably adapted to be raised or lowered at will, as by means of side chains 45 and side chains 46 mounted on pulleys 47 and 48 respectively. The pulleys 47 and 48 may respectively be keyed to shaft assemblies 49 and 50 which in turn are operated by a crank or lever 51 and 52 respectively. The shaft assemblies 49 and 50 may be journaled in suitable bearings mounted on the frame 54, as more fully set forth hereinafter.

The frame 54 may comprise parallel longitudinal tubular members 55 and 56 secured as by welding at their forward end regions, to a base plate 57. Extensible members 58 and 59 may respectively be telescoped at their forward end portions through the rearward end regions 60 of the tubular members 55 and 56. The rearward end portions of the extensible members 58, 59 may be secured as by welding to a transverse tubular member 61. Thus there may in effect be formed two U-members of which the rearward U-member 62 is telescoped within the forward U-member 63.

A suitable receptacle 64 for holding the fuel container or containers 44 may be mounted on legs 65 secured as by welding to the forward U-member 63.

Each of the shaft assemblies 49 and 50 comprises a forward shaft 53 and a rearward shaft 66. The forward shaft 53 may be journaled in suitable bearings 57 mounted on the forward U-member 63. The rearward shaft 66 may be journaled in suitable bearings 68 and 69 mounted on the rearward U-member 62.

A coupling 70 may be welded to the forward end portion of each of the rearward shafts 66, and adapted to receive and to hold the rearward end region of the forward shaft 53 when the rearward U-member 62 is fully inserted within the forward U-member 63, as illustrated in FIGURE 3.

A removable shaft 71 may be provided, having a coupling 72 welded to the forward end thereof. The rearward end region 73 of the removable shaft 71 may be engageable with the coupling 70. Thus, when the shaft 53 is released from the coupling 70 and the rearward U-member 62 is telescoped outwardly a suitable distance from the forward U-member 63, the rearward end 73 of each removable shaft 71 may be engaged with the coupling 70, and the coupling 72 may be engaged with the rearward end portion 74 of the forward shaft 53. Each of the shaft assemblies 49 and 50 may thus be elongated at will. Thus the telescoped U-members 62 and 63 may be adjusted in lengthened or shortened condition as desired.

Figure 5:
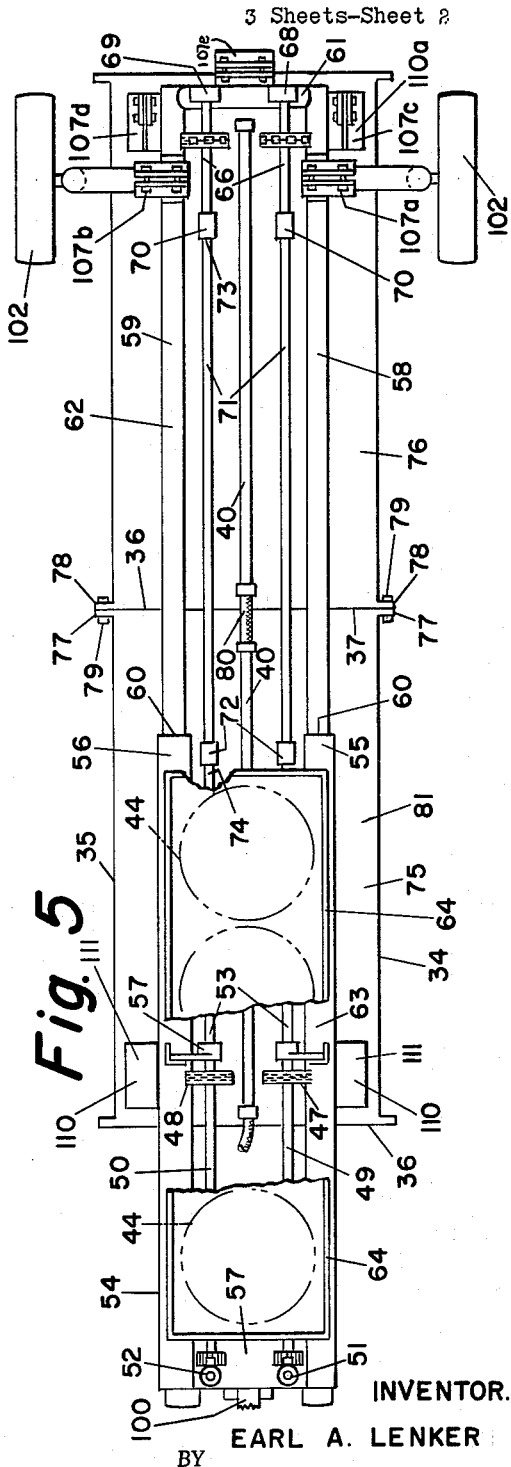
FIGURE 5 represents a plan view of the paving device comprising a chassis, illustrated in FIGURE 4, and embodying my invention.

In this manner, heat reflecting units 33 of various lengths may be used, or plural units may be mounted on the shaft. Thus for instance, as illustrated in FIGURES 4 and 5, heat reflecting units 75 and 76 may be provided, and constructed substantially similar to the heat reflecting unit 33. The heat reflecting unit 75 may have flanges 77 projecting sidewardly from the rear wall 37 thereof, and the heat reflecting unit 76 may have similar flanges 78 projecting sidewardly from the forward wall 36 thereof. Suitable nut and bolt assemblies 79 may secure the flanges 77 to the registering flanges 78. In practice, the unit 33 may be made with both forward flanges 78 and rearward flanges 77, so as to be used interchangeably as a main heater 33, forward heater 75 or rearward heater 76. A flexible hose 80 may couple together the manifolds 40 of the heat reflecting units 75 and 76. The heat reflecting units 75 and 76 are thus combined to form a unitary heat reflecting assembly 81. The side chains 45 and 46 may be connected to the unitary heat reflecting assembly 81 in substantially the same manner in which they may be connected to the heat reflecting unit 33.

In one preferred form, connection of each of the chains 45, 46 to the heat reflecting unit 33 or assembly 81 is made by means of an S-link 82 inserted at one end portion to a desired link 83 of the chain 45, 46, and at the other end portion to one of a plurality of suitable lugs or eyelets 84 projecting upwardly from the top 38 of the unit 33 or assembly 81. The opposed end portion 89 of the chain 45, 46 may be anchored in any suitable manner on its pulley 47, 48.

In a preferred form, the forward pulleys 47 and 48 are disposed in substantially the same vertical plane, and the rearward of the pulleys 47, 48 are similarly disposed in substantially the same vertical plane. The chains 45, 46 respectively held by the pulleys 47, 48 are disposed about the respective outer marginal regions 90 and 91 thereof. The inner peripheries of the tubular members 55 and 56 are preferably spaced a distance less than the greatest distance between the outer marginal regions 90 and 91 of the co-planar pulleys.

Initial adjustment of the heat reflecting unit 33 or assembly 81 with respect to the elevation or tilt thereof, may be made by means of the S-link 82 being disposed in the most convenient link of the chain 45 or 46 when said chain is drawn tautly toward the S-link 82. Finer adjustment may then be made by means of rotation of the crank 51 or 52 respectively keyed to the pulley 47 or 48 which holds the chain. The crank 51, 52 may be releasably secured by means of a suitable pawl device 92 to a ratchet 93 carried by the frame 54. When it is desired to raise the heat reflecting unit 33 or the assembly 81, the cranks 51, 52 are operated in a manner to rotate their respective pulleys 47, 48 to draw their respective chains 45, 46 about their peripheries; and the cranks 51, 52 are allowed to remain in their lifted condition by means of the pawl 92 and ratchet 93. In this lifting operation, the chains 45, 46 are not only drawn upwardly, but their angles are shortened with respect to the top 48, as indicated at 88. In this manner, sway of the unit 33 or assembly 81 during transportation of the chassis 32 is substantially reduced.

The base plate 57 preferably has a step bearing 94 downwardly projecting therefrom along the central axis of the frame 54. A corresponding step bearing 95 may be axially disposed beneath the bearing 94, and a journal 96 may be disposed through both bearings 94 and 95. If desired, the journal 96 may be fixedly mounted within one of said bearings 94, 95 and rotatably disposed within the other. An axle 97 is preferably fixedly secured to the lower bearing 95, and may have rotatably mounted thereon parallel front wheels 98. In a preferred form, the outer edges 99 of the front wheels 98 are disposed a distance less than the distance between the side walls 34 and 35 of the heat reflecting unit 33 or assembly 81. A suitable tongue 100 may be secured to the axle 97 by any suitable means, and comprise a pindle hook 101 adapted to be connected to the pindle (not shown) of a service truck or other suitable traction device.

The rearward and side portions of the frame 54 are mounted on removable wheel assemblies 102. Each assembly 102 comprises a wheel 103 rotatably mounted on an axle 104 projecting in one direction from the lower end portion of a strut 105 which has projecting in an opposed direction from the other end thereof, a stud 106. The stud 106 is insertable in a suitable clamp 107 secured to the U-member 62 as by welding.

In a preferred form, one such clamp 107a is disposed along an axis perpendicular to the vertical plane of the extensible member 58, and in the vicinity of the rear of said member; and a clamp 107b is similarly disposed with respect to the extensible member 59. In addition, a clamp 107c may be mounted on the extensible member 58 rearwardly of the clamp 107a, and parallel to the vertical plane of the extensible member 58, and a clamp 107d may be similarly mounted on the extensible member 59; and in a preferred form, a clamp 107e may be mounted on the transverse member 61 and parallel thereto. It is to be understood that in place of the clamp 107, other suitable couplings (not shown) may be used.

When it is desired to move the chassis 32 in a forward or rearward direction, and to carry the heat reflecting unit 33 or 81 in a position substantially symmetrical with the frame 54, the wheel assemblies 102 are each inserted in a respective clamp 107a, 107b, and the clamp tightened to hold the wheel assembly in vertical position. The tongue 100 is then moved to a position along the vertical axial plane of the frame 54; and the chassis 32 is now in condition to be moved forwardly or rearwardly, or to be steered into an arcuate movement by swinging the tongue 100 about the bearing 95 and urging it forwardly or rearwardly, as required.

When it is desired to project the heat reflecting unit 33 or 81 laterally outward, substantially beyond the margin of the frame 54, the chains 45, 46 may be moved to other appropriate lugs or eyelets 84 projecting from the top 38 of the unit 33 or 81. Thus for instance when it is desired to have the unit 33 project laterally a substantial distance beyond the left margin of the frame 54 so as to heat a longitudinal joint 30, as illustrated in FIGURES 1 and 7, the chain 45 may be moved to a lug 84a disposed inboard of the marginal row of lugs 84. To aid in positioning the chain for optimum performance in the lateral projection of the unit 33 or 81, as illustrated in FIGURE 7, an auxiliary bearing surface 110 may be used. Thus, I may provide a tubular member 111 having a smooth outer surface 110, and welded to the outer edge of the longitudinal tubular member 55, 56. If desired, such a bearing surface 110a may be utilized on the rearward clamps 107c, 107d; or additional tubular or other suitable members (not shown) may be secured to the rearward tubular members 58, 59 to provide such a bearing surface for the chains 45, 46 secured to the rearward pulleys 47, 48. Or if desired, the outer margin or margins of the tubular members 55, 56, 58, 59 may be utilized to provide such a bearing surface.

When the unit 33 or 81 is thus positioned laterally outward, the left hand wheel assembly 102 is preferably transferred from the clamp 107a to the clamp 107e as illustrated in FIGURES 1, 7 and 8. In the same manner, should it be desired to project the unit 33 or 81 laterally outward to the right (as when the chassis 32 is accompanying the paving machine 10 on the left hand side thereof), the wheel assembly 102 is transferred from the clamp 107b to the clamp 107e; and the appropriate chain adjustments are made.

Because of the difference in elevation between clamps 107a, 107b and the clamps 107c, 107d, 107e, and also when required by the tilt of the frame 54 occasioned for instance by one or more wheels riding on a different elevation than that of the remaining wheels, it may be desired to adjust the level or inclination of the unit 33 or 81. This may be done as aforesaid by placing the S-links 82 in the appropriate links of the chains 45 and 46, or by raising or lowering the cranks 51, 52. In addition, it may be done by changing the vertical angles of the struts 105 of the wheel assemblies 102. Indeed, fine adjustments of level or inclination of the unit 33 or 81 may be made by varying the vertical angles of the struts 105.

Should it be desired to move the chassis 32 in a manner to convey the unit 33 or 81 transversely, the wheel assemblies 102 may be transferred from the clamps 107a, 107b to the clamps 107c, 107d respectively; and the tongue 100 swing to a horizontal position perpendicular to the longitudinal axis 112 of the frame 54. All of the wheels 98 and 103 are thus disposed in parallel relation, perpendicular to the longitudinal axis 112 of the frame 54. Urging of the tongue 100 along its own axis will move the chassis 32 transversely, thereby conveying the unit 33 or 81 broadside, as for instance when it is desired to heat an area of asphalt-type paving in the course of a patching operation.

It will thus be found that my novel chassis 32 makes it possible to convey a utilitarian device such as the heat reflecting units 33, 81 in any desired direction across an object, such for instance as an asphalt-type joint or patch area, with respect to which it is to perform a work function, free of interference from the wheels or frame which conveys the utilitarian device. Not only may the heat-reflecting unit be moved across an area of bituminous concrete in a manner to soften the same without passing the wheels 98 or 103 over the softened area, as for instance illustrated in FIGURES 6 and 9; but as illustrated in FIGURE 7, the heat reflecting unit 33, 81 may also be positioned immediately next to an abutment, such for instance as a curb 113, or to the paving machine 10 itself, without interference from the chassis wheels 98, 103 or its frame 54.

The mounting of the wheels 98 on an axle 97 which is perpendicular to the journal 96 in the bearing 94 rigidly mounted on the frame 54, inhibits the frame 54 from moving to a forwardly inclined position when one of the front wheels 98 passes over a depression such as the worn spot 114 in the area over which the chassis 32 is to travel. Thus, the proper level or inclination of the unit 33, 81 is further assured.

Further assuring the maintaining of a desired level or inclination of the unit 33, 81 as well as the establishing of good balance and stability, is the novel construction whereby the frame is supported by two rigidly mounted front wheels and substantially spaced apart rear wheels, establishing in effect a three-point suspension on which the unit 33, 81 is carried.

The disposition of the frame 54 above the units 33, 81, provides room for the raising, lowering, and adjusting the inclination of the units 33, 81 as may be required by the area to be worked upon, or for lifting the unit 33, 81 to an upper position such as that illustrated at 115 wherein sway is substantially reduced when it is desired to convey the unit 33, 81 rapidly from one work area to another; while at the same time making adequate provision for the wheels and wheel mountings whereby the units 33, 81 may be moved, in work-performing position, in any direction and without interference between the frame or wheels and any object associated with the area on which the work is to be performed. Cooperating to produce this function, is the disposition of the frame 54 and front wheels 98, inboard of the units 33, 81, regardless of the angle to which the wheels 98 may be turned with respect to the journal 96.

If desired, a skid 116 may be disposed across the front wall 36 of the unit 33, 81 at the bottom thereof, to engage any small obstruction as the chassis moves forward, and to enable the unit 33, 81 to ride over such obstruction without damage to the unit or chassis.

The chassis of my invention renders propane fluid infrared heating more versatile, thereby substantially improving the paving art. Thus the chassis may be manually moved from place to place where needed, or it may be towed or pushed by any suitable truck or other device; but in either event, the unit 33, 81 may be placed in optimum position and exactly where needed.

It can be operated by a single man, who can be trimming joints or otherwise active on the paving job while the heater is at work, thereby substantially reducing the labor and equipment usually needed for such a job. And by using it alongside a paving machine it is possible to eliminate the shuttling of the machine 10 back and forth from one paving strip to another, and instead to make it possible to pave one long, single strip in one day, and to pave the next adjacent strip the next day, thereby effecting substantial saving in time, fuel and labor.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention, what I claim as new and desire to secure by Letters Patent is:

1. A paving heating device adapted to be conveyed over an area, and comprising:
   a frame;
   a wheel assembly pivotally secured to said frame;
   a removable wheel assembly;
   a plurality of mountings for said removable wheel assembly, and adapted alternatively to retain said removable wheel assembly in frame-supporting condition, said mountings being disposed along diverse axes on said frame;
   said first-mentioned wheel assembly comprising a wheel and being adapted to be rotated in a manner selectively to dispose said wheel in a plurality of vertical planar positions;
   said removable wheel assembly comprising a wheel;
   said first-mentioned wheel and said last-mentioned wheel being adapted to be disposed substantially along vertical parallel planes in one condition when said removable wheel assembly is mounted on one of said mountings, and substantially along vertical parallel planes disposed at an angle to said first-mentioned vertical parallel planes when said removable wheel assembly is mounted on another of said mountings, and said first-mentioned wheel is pivoted to a position parallel to said last-mentioned wheel;
   said removable wheel assembly comprising a strut, an axle disposed on one end region of said strut, and a stud disposed at the opposite end region of said strut;
   said stud being adapted selectively to be engaged with said mountings, to be supported thereby;
   said stud being adapted selectively to be engaged with one of said mountings in any of a plurality of radial angles with respect to the axis of said mounting;
   a heater carried by said frame and adapted to perform a heating function with respect to paving disposed in said area;
   said heater being adapted to perform said heating function about an axis in the direction of movement of said device;
   said frame having a longitudinal axis;
   said heater being capable of performing said heating function when said axis of said function is disposed along a vertical plane other than the vertical plane in which the longitudinal axis of the frame is disposed;
   means for disposing said heater in diverse positions with respect to said frame, said means including:
      means to offset said heater laterally with respect to said frame,
      means to raise and lower said heater,
      said heater being adapted to perform a heating function when in lowered condition, and to be conveyed by said frame when in said raised condition,
      said raising and lowering means being adapted to reduce the sway of said heater when said heater is in raised condition;
   said heater being adapted to be coupled to an auxiliary heater;
   means for extending said frame over said auxiliary heater and extending said means for raising and lowering said first-mentioned heater, operably to carry said auxiliary heater in the same operation; and
   means for fixing the frame in said extended condition.

2. A paving heating device comprising:
   a frame;
   a wheel assembly pivotally secured to said frame;
   a removable wheel assembly;
   a plurality of mountings for said removable wheel assembly, and adapted alternatively to retain said removable wheel assembly in frame-supporting condition,
      said mountings being disposed along diverse axes on said frame;
   a heater carried by said frame,
   means for disposing said heater in diverse positions with respect to said frame, said means including:
      means to offset said heater laterally with respect to said frame,
      means to raise and lower said heater with respect to said frame, said raising and lowering means being adapted to reduce sway of said heater when said heater is in raised position;
   means for coupling an auxiliary heater to said first-mentioned heater;
   means for extending said frame over said auxiliary heater;
   means for fixing the frame in said extending condition and extending said means for raising and lowering said heaters, operably to carry the auxiliary heater in the same operation.

3. In combination:
   a chassis including a frame adapted to be horizontally conveyed;
   means to convey said chassis horizontally;
   a utilitarian device adapted to be carried by said frame during said horizontal conveyance;
   a plurality of pulleys rotatably mounted on said frame;
   means to fix said pulleys in any of various angles of rotation;
   said utilitarian device being suspended by said pulleys by means of suspension lines anchored at one end to said pulleys and disposed about the peripheries thereof, the other end being secured to said utilitarian device;

constricting means disposed between said pulleys and said utilitarian device, and adapted to change the angle of said suspension lines between said constricting means and said utilitarian device when said utilitarian device is raised, thereby to reduce the sway of said utilitarian device during said horizontal conveyance.

4. A paving heating device adapted to be conveyed over an area, and comprising:
a frame;
a heater carried by said frame;
a wheel assembly comprising:
a plurality of frame-supporting wheels, and
a mounting mechanism for one of said wheels and mounted on said frame;
said mounting mechanism comprising a plurality of alternative mounting devices for said wheel, and being disposed in a manner to enable said last-mentioned wheel to be alternatively mounted in a plurality of parallel planes operably selectively to dispose said heater in a plurality of positions with respect to said wheel and to said area.

5. A paving heating device as defined in claim 4, and further characterized by:
said wheel assembly, said heater and said mounting mechanism being so disposed with relation to each other that when said last-mentioned wheel is mounted in one position the sides of said heater are embraced by said wheel assembly, and when said last-mentioned wheel is mounted in another position said heater projects laterally exterior the vertical planes of said wheels while being carried by said frame on said wheel assembly.

6. A paving heating device as defined in claim 4, and further characterized by:
said wheel assembly including for said one wheel, a strut, a wheel-carrying axle disposed on one end region of said strut, and a stud disposed at the opposite end region of said strut;
said stud being adapted selectively to be engaged with any one of said mounting devices, to be supported thereby.

7. A paving heating device as defined in claim 4, and further characterized by:
said wheel assembly including for said one wheel, a strut, a wheel-carrying axle disposed on one end region of said strut, and a stud disposed at the opposite end region of said strut;
said stud being adapted selectively to be engaged with one of said mounting devices in any of a plurality of radial angles with respect to the axis of said mounting device.

8. A paving heating device adapted to be conveyed over an area and comprising:
a frame;
a heater carried by said frame;
a frame-sustaining wheel assembly pivotally secured to said frame about a vertical axis;
a displaceable wheel assembly comprising:
a plurality of frame-supporting wheels, and
mounting mechanism disposed in diverse axes operably to enable said last-mentioned wheels to be selectively mounted thereon in any of a plurality of axes;
said frame-sustaining wheel assembly comprising a wheel adapted to be disposed in a plurality of substantially vertical planar positions when the wheel assembly of which it is a part is pivotally adjusted with respect to said frame;
said last-mentioned wheel and said frame-supporting wheels being adapted to be disposed substantially along vertical parallel planes in one condition when said frame-supporting wheels are mounted in one set of positions in said mounting mechanism, and substantially along vertical parallel planes disposed at an angle to said first-mentioned vertical parallel planes when said frame-supporting wheels are mounted in another set of positions in said mounting mechanism, and said wheel of said frame-sustaining wheel assembly is pivoted to a position parallel to said frame-supporting wheel.

9. A paving heating device as defined in claim 4, and further characterized by:
said frame comprising a base portion and an extensible member;
said extensible member being in substantially telescoped relation to said base portion;
said wheel assembly being mounted on said base portion, and said mounting mechanism being disposed on said extensible member.

10. A paving heating device as defined in claim 9, and further characterized by:
an auxiliary heater coupled to said first-mentioned heater and carried by said frame.

11. A paving heating device as defined in claim 10, and further characterized by:
said heaters being adapted to perform a heating function with respect to paving disposed in said area, and along an axis in the direction of movement of said paving heating device as said device is conveyed over said area;
said frame having a longitudinal axis;
said heaters being capable of performing their heating function with respect to said paving when the axis of said function is disposed along a vertical plane other than the vertical plane in which the longitudinal axis of the frame is disposed.

12. A paving heating device as defined in claim 11, and further characterized by:
said wheel assembly and said mounting mechanism being so disposed with respect to said frame and said heaters as to enable said heaters to be carried by said frame in one location when said last-mentioned wheel is mounted in one of said positions, and to carry said heaters in another location and in heating function performing relation to said paving and along said axis thereof when said last-mentioned wheel is disposed in another of said positions.

13. A paving heating device as defined in claim 4, and further characterized by:
said heater being adapted to perform a heating function with respect to paving disposed in said area, and along an axis in the direction of movement of said paving heating device as said device is conveyed over said area;
said frame having a longitudinal axis;
said heater being capable of performing its heating function with respect to said paving when the axis of said function is disposed along a vertical plane other than the vertical plane in which the longitudinal axis of the frame is disposed.

14. A paving heating device as defined in claim 13, and further characterized by:
said wheel assembly and said mounting mechanism being so disposed with respect to said frame and said heater as to enable said heater to be carried by said frame in one location when said last-mentioned wheel is mounted in one of said positions, and to carry said heater in another location and in heating function performing relation to said paving and along said axis thereof when said last-mentioned wheel is disposed in another of said positions.

15. A paving heating device as defined in claim 13, and further characterized by:
means selectively to raise and lower said heater;

said heater being adapted to perform its heating function with respect to said paving when said heater is in lowered condition, and to be conveyed to said area by said frame when said heater is in its raised conditions;

said raising and lowering means being adapted to reduce sway of said heater when said heater is in said raised condition.

16. A paving heating device as defined in claim 4, and further characterized by:

means to raise and lower said heater;

said heater being adapted to heat paving disposed in said area when said heater is in lowered condition, and to be conveyed to said area by said frame when said heater is in its raised condition;

said raising and lowering means being adapted to reduce sway of said heater when said heater is in said raised condition.

17. A paving heating device adapted to be conveyed over an area, and comprising:

a frame;

a heater;

a plurality of pulleys rotatably mounted on said frame;

means to fix said pulleys in any of various angles of rotation;

said heater being carried by said pulleys by means of suspension lines anchored at one end to said pulleys and disposed about the outer peripheries thereof, the other end being secured to said heater;

constricting means disposed between said pulleys and said heater, and adapted to change the angle of said suspension lines between said constricting means and said heater when said heater is raised.

18. A paving heating device adapted to be conveyed over an area, and comprising:

a frame;

a heater;

a plurality of adjustable supports mounted on said frame;

said heater being carried by means of suspension lines anchored at one end to said adjustable supports, the other end being secured to said heater;

constricting means disposed between said adjustable supports and said heater, and adapted to reduce the angle of said suspension lines between said constricting means and said heater when said heater is raised.

References Cited by the Examiner
UNITED STATES PATENTS

| | | | |
|---|---|---|---|
| 533,608 | 2/1895 | Penberthy | 126—271.3 |
| 633,691 | 9/1899 | Garvey | 126—271.2 |
| 2,117,518 | 5/1938 | Smola | 254—136 X |
| 2,558,160 | 6/1951 | Sowell | 126—271.2 |
| 2,672,721 | 3/1954 | Adams | 56—228 X |
| 2,727,346 | 12/1955 | Witwer | 280—35 X |
| 2,891,536 | 6/1959 | Ford | 126—271.2 |
| 3,055,280 | 9/1962 | Neveille | 126—271.2 X |

CHARLES J. MYHRE, *Primary Examiner.*

JAMES W. WESTHAVER, *Examiner.*